United States Patent Office 3,494,910
Patented Feb. 10, 1970

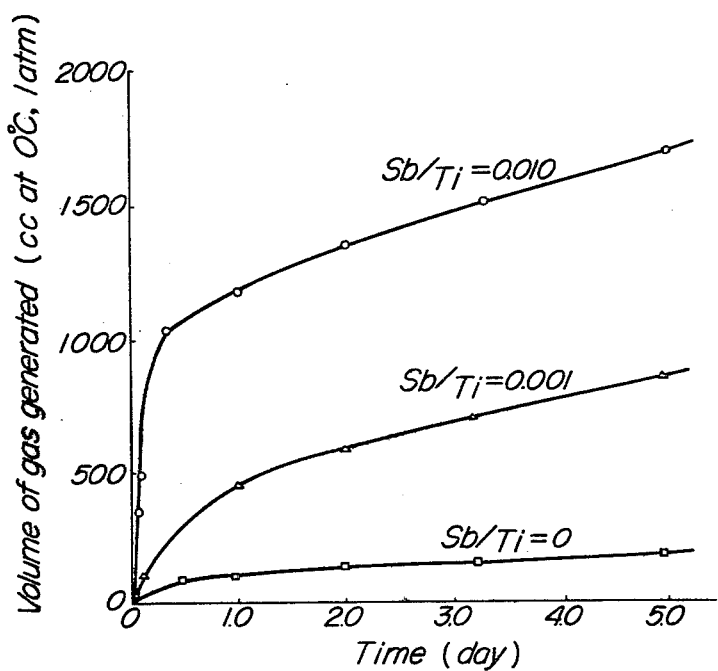

3,494,910
PROCESS FOR POLYMERIZING α-OLEFINS UTILIZING A NOVEL TERNARY CATALYST
Yukichi Takashi and Itsuho Aishima, Nobeoka-shi, and Yuji Kobayashi and Yoshio Tsunoda, Tokyo, Japan, assignors to Asahi Kasei Kogyo Kabushiki Kaisha, Osaka, Japan, a corporation of Japan
Continuation of application Ser. No. 463,311, June 11, 1965. This application Sept. 25, 1967, Ser. No. 670,465
Int. Cl. C08f 1/42, 1/34
U.S. Cl. 260—93.5
10 Claims

ABSTRACT OF THE DISCLOSURE

A process for producing a polyolefin having high isotacticity in which an α-olefin is polymerized by using a ternary catalyst consisting of $TiCl_3$, an organoaluminum compound and $R_3SbX_2$ wherein R is an alkyl group of 2–5 carbon atoms and X is a halogen.

---

This application is a streamlined continuation of Ser. No. 463,311, filed on June 11, 1965, which is a continuation-in-part of application Ser. No. 215,327, filed on Aug. 7, 1962, both now abandoned.

This invention relates to a process for manufacturing a highly isotactic polyolefin by employing a novel catalyst.

The object of the present invention is to provide a process for manufacturing a polyolefin so highly enriched in isotactic structure as to give fibers, films and other shaped articles of superior properties when said polymerization product is used without any further purification such as extraction or conducting fractional dissolution.

Heretofore, various processes have been proposed for polymerizing α-olefin. Especially, Natta et al. have disclosed that in a process for polymerizing α-olefin especially propylene by using a catalyst consisting of e.g., $TiCl_4$ and $AlR_3$, a polymer having a high stereo-specificity and a high crystallization tendency, that is, an isotactic polymer having a high molecular weight, may be produced by employing a solid, particularly a crystalline, insoluble catalyst, for example a catalyst consisting of trialkylaluminum and titanium trichloride. However, even when propylene is polymerized according to said process, the proportion of the polymer having an isotactic structure is less than 80%, and the product contains a considerably large amount of non-crystalline polymer (atactic and stereo-block polymer), which is considered as having a stereo-irregular structure. A fiber prepared from a polymer having such a degree of isotacticity produces a waxy-touch, and this fact has been a great obstruction to the practical use thereof. For the sake of overcoming this problem, Natta et al. have reported that superior fibers, films and the like may be prepared when the polymer obtained by the above-said method was subjected to extraction with an organic solvent, for example with 2-ethylhexane, to remove the non-crystalline atactic and stereoblock polymer.

Natta et al. have further disclosed that in a process for polymerizing propylene by the use of the catalyst obtained in a combination of titanium trichloride [corresponding to $(TiCl_3)_3 \cdot AlCl_3$] which is prepared by the reduction of titanium tetrachloride with metallic-aluminum, and dialkyl-aluminum-chloride, a polypropylene having about 93% of isotacticity may be produced [G. Natta, Chem. e. Industrie, 42, p. 1207 (1960)].

That is, the present invention concerns a process for structure and have now discovered a process for producing polyolefin highly enriched in isotactic structure at a very rapid polymerization rate.

That is, the present invention concerns a process for manufacturing a crystalline polyolefin highly enriched in isotactic structure which comprises polymerizing an α-olefin by using a catalyst obtained by the reaction of (A) a member selected from the group consisting of trialkyl-antimony-dihalide of the formula $R_3SbX_2$, wherein R is an alkyl group of 2 to 5 carbon atoms and X is a halogen atom, (B) a member selected from the group consisting of organo-aluminum compounds and (C) titanium trichloride.

The present invention has the following salient characteristics. First, the process according to the present invention produces a high-crystalline polymer having a high degree of stereo-regularity. For example, when propylene is polymerized under proper polymerization conditions, almost perfect isotactic polypropylene is produced.

Second, the catalyst of this invention possesses a high polymerization activity, and has the ability to polymerize α-olefin at a very rapid polymerization rate.

Third, the polymer produced by the process of the invention is such a highly isotactic polymer that the polymer imparts to fibers, films and other shaped articles a fine feeling when the polymerization product is processed as is without any treatment such as extraction and fractional dissolution.

The polymerization process of the invention has another characteristic. That is, because the polymer obtained in the process of the invention is a polymer highly enriched in stereo-regularity and the polymerization medium dissolves only a small amount of soluble polymer, the viscosity of the polymerization medium is very low, and consequently the concentration of the insoluble polymer in the polymerization medium at the final polymerization stage can be made to increase considerably.

The catalyst employed in the invention is the reaction product obtained by the reaction of the following three components as starting materials, that is, a trialkyl antimony dihalide, an organo-aluminum compound and titanium trichloride. The organo-aluminum compound and titanium trichloride are substantially inactive as already pointed out by G. Natta (Angew. Chem., 69, 213 (1957)), and only in the presence of $R_3SbX_2$, for example $Sb(C_2H_5)_3Cl_2$, can the remarkable reaction among these catalyst components take place. That is, the color of the solid phase in the reaction medium changes gradually from the initial violet to the final black via brown and at the same time a large amount of gas evolves.

For example, the difference in the change of reactivity will be verified from the following fact. That is, the difference of reactivity in the two cases will be clarified as indicated in the figure, if the amount of evolved gas when triethyl aluminum and titanium trichloride are allowed to react with one another under the reaction conditions as indicated in Table 1 is compared with the evolved gas when trialkyl aluminum, titanium trichloride and triethyl antimony dichloride are allowed to react with each other.

When triethyl aluminum and titanium trichloride are allowed to react, the evolved gas is very little or almost nil. When triethyl aluminum, titanium trichloride and trialkyl antimony dichloride are allowed to react, the gas evolves very rapidly upon the addition of trialkyl antimony dichloride.

The gas evolved contains more than 95% of ethane and the balance are other gases such as hydrogen, ethylene propylene, propane, butane and butene.

TABLE 1.—THE REACTION CONDITIONS AMONG CATALYST COMPONENTS

Reaction materials:
  $TiCl_3$, mole _____ 0.10
  $Al(C_2H_5)_3$, mole _____ 0.50
  $Sb(C_2H_5)_3Cl_2$, mmole _____ 0, 0.1, 1.0
Reaction temperature, ° C. _____ 60
Reaction time, days _____ 1.0, 2.0, 5.0

The trialkyl antimony dihalide employed in the present invention is of the formula $R_3SbX_2$, wherein R is an alkyl group of 2 to 5 carbon atoms and X is a halogen atom, and for example such compounds which may successfully be employed are $(C_2H_5)_3SbCl_2$, $(C_2H_5)_3SbBr_2$, $(C_2H_5)_3SbI_2$, $(C_3H_7)_3SbCl_2$ and $(C_4H_9)_3SbBr_2$. These compounds are liquid and soluble in the organic solvents which are used for the polymerization medium.

The antimony salt used in Australian Patent No. 233,098 is essentially different from the trialkyl antimony dihalide used in the present invention as follows:

TABLE 2

| | Trialkyl antimony dihalide | Tetraalkyl antimony salt |
|---|---|---|
| General formula | $R_3SbX_2$ | $R_4SbX$ |
| Structure | 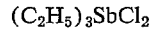 Trigenal bipyramidal non-ionic | $SbR_4^+X^-$ Ionic salt |
| Property | (1) Distillable. (2) Soluble in hydrocarbon such as n-hexane. (3) Not soluble in water and immiscible. | (1) Not distillable. (2) Not soluble in hydrocarbon such as n-hexane. (3) Easily soluble in water. |

As shown in Table 2, the two compounds are completely different in their basic properties.

The trialkyl antimony dihalide has a remarkably great usefulness in industry as compared with the tetraalkyl antimony halide. That is, the latter is insoluble in conventionally used hydrocarbon media, and consequently the reproducibility of the polymerization is very low when the antimony compound is used as a catalyst of the polymerization. On the other hand, the trialkyl antimony dihalide is easily soluble in all the hydrocarbon media, and hence its use results in polymerization of a high reproducibility.

The polymerization was effected in the same manner as in Examples 1–7 described hereinafter, by employing the following conditions.

Polymerization conditions: Mmols
  $TiCl_3$ _____ 25
  $AlEt_3$ _____ 50
  Organo antimony compound _____ 2

The comparison of the catalysts in industrial usefulness can be made from the obtained results as follows:

TABLE 3.—REPRODUCIBILITY OF POLYMERIZATION

| Run No. | Rate of Polymer/g. $TiCl_3$·hr. | | $[\eta](g./100\ cc.)^{-1}$ | |
|---|---|---|---|---|
| | $(C_2H_5)_3SbCl_2$ | $(C_2H_5)_4SbI$ | $(C_2H_5)_3SbCl_2$ | $(C_2H_5)_4SbI$ |
| 1 | 123 | 63 | 3.45 | 3.15 |
| 2 | 121 | 94 | 3.41 | 2.50 |
| 3 | 119 | 50 | 3.25 | 4.10 |
| 4 | 121 | 110 | 4.03 | 2.03 |
| 5 | 125 | 35 | 3.80 | 4.32 |

As is apparent from Table 3, the trialkyl antimony dihalide is markedly superior to the tetraalkyl antimony halide.

The organo-aluminum compound employed in the present invention is a trialkyl aluminum or an alkyl aluminum halide, and especially triethyl aluminum, tripropyl aluminum, triisobutyl aluminum or diethyl aluminum chloride are employed as the active catalyst component.

The titanium trichloride employed as an effective catalyst component in the present invention is titanium trichloride obtained by reducing titanium tetrachloride with hydrogen or titanium trichloride obtained by reducing titanium tetrachloride with a metal, especially titanium trichloride [corresponding to $(TiCl_3)_3 \cdot AlCl_3$] obtained by reducing titanium tetrachloride with metallic-aluminum in the presence of a small amount of $AlCl_3$ as catalyst or fine triturate thereof.

As regards the quantity of the catalyst components, the titanium trichloride is suitably employed in the range of 0.0001 to 0.05 mol per mol of α-olefin to be polymerized, and the trialkyl aluminum is employed in the range of 1 to 8 mols per mol of titanium trichloride and the trialkyl antimony dihalide is employed in the range of 0.001 to 0.2 mol per mol of titanium trichloride are preferably employed respectively.

The addition of the organo-aluminum compound in an amount less than 1 mol per mol of titanium trichloride is not favorable for the polymerization because the polymerization is inhibited or terminated at this amount. However, the addition in a large amount of more than 8 mols has no significance since it produces no material influence on the polymerization rate, but only lowers the degree of polymerization of the polymer.

The trialkyl antimony dihalide used in the present invention exhibits a remarkable effect, even in an unexpectedly small amount, on the polymerization of olefins and have unique or particular properties of inhibiting the polymerization when used in a large amount as are the phosphoric compounds used in Belgian Patent No. 608,-467.

The fact will be shown by the following Examples 1–16.

As is seen clearly from Examples 1–7, the use of $$(C_2H_5)_3SbCl_2$$

in an amount as small as 0.016 mole per mole of $TiCl_3$ caused the polymerization rate to reach several times the rate when said compound was not used, and resulted in polypropylene having a high isotacticity. The use of said Sb-compound in an amount as large as 0.495 mole per mole of $TiCl_3$ inhibited the polymerization almost completely.

The trialkyl antimony dihalides exhibit substantially different behavior from that of the P-compounds which the above-mentioned Belgian patent uses in a large amount as shown in all the examples of this patent concerning the P-compounds.

The above-mentioned particular effect of the trialkyl antimony dihalides is also clearly shown in the examples of the present invention.

In the practice of the present invention, a reaction medium may or may not be employed. In the former case, a medium selected from the group consisting of aliphatic, alicyclic and aromatic hydrocarbons, such as butane, n-hexane, n-heptane, isooctane, benzene, toluene, cyclohexane, tetrahydronaphthalene and the like may be utilized as a reaction medium inert to said catalyst components. The proportion of said medium to α-olefin may be freely determined according to the form of polymerization employed, however, generally it is sufficient to use less than 20 parts by weight of said medium to 1 part by weight of α-olefin.

In the practice of the invention, the polymerization temperature required for obtaining a good polymer having a high molecular weight is in the range of between 15° C. and 120° C., particularly between 20° C. and 80°

C. Also, the polymerization pressure may freely be determined, however, a pressure of from atmospheric pressure to 50 atms., normally from 1 to 10 atms., may successfully be employed to attain the object.

The order of adding the catalyst components in the preparation thereof does have any particular influence in its effect as a catalyst.

The process according to the present invention may successfully be applied to the polymerization of styrene and of α-olefins such as butene-1, 3-methyl butene-1, hexene-1, pentene-1 or 4-methyl pentene-1 as well as propylene and a white solid polymer may be obtained in any of these cases.

The embodiments of the present invention will be better understood from a consideration of the following examples, which are given merely for the sake of illustration.

EXAMPLES 1–7

Into a 300 cc. volume stainless steel autoclave were charged 150 cc. of n-hexane, and then under a nitrogen stream free from oxygen, 16.5 mmols of titanium trichloride, 33 mmols of triethyl aluminum, and various amounts of triethyl antimony dichloride were added thereto and then the autoclave was sealed. Highly pure propylene (20 g.) was condensed into the autoclave cooled at −80° C., and then the temperature was raised to 50° C. while the contents were shaken. After the pressure of the autoclave was completely reduced by polymerization, the autoclave was opened and charged with 500 cc. of methanol to decompose the remaining catalyst components. The contents were boiled with 30% hydrochloric acid and methanol, washed with water, and dried to obtain a white powered polymer.

From the rate of reduction of the polymerization pressure, there was calculated the polymerization rate per unit weight of catalyst per unit time (converted as a value at a monomer partial pressure of 3 kg./cm.$^2$). Further, the isotacticity was determined from the weight of the remaining polymer when hot extraction of the produced polymer was effected with n-heptane. The intrinsic viscosity was also determined in Tetralin solution at 135° C.

The obtained results are shown in Table 4.

TABLE 4

| Experiment No. | $(C_2H_5)_3Sb\cdot Cl_2$ (mmol) | $(C_2H_5)_3SbCl_2/$ $TiCl_3$ (mol ratio) | Polymerization rate [1] | $[\eta]$ (g./100 cc.)$^{-1}$ | Isotacticity, percent |
|---|---|---|---|---|---|
| 1 | None | 0 | 21 | 4.64 | 78.3 |
| 2 | None | 0 | 23 | 3.80 | 78.3 |
| 3 | 0.181 | 0.011 | 71 | 4.00 | 87.5 |
| 4 | 0.264 | 0.016 | 130 | 3.10 | 86.3 |
| 5 | 1.84 | 0.114 | 120 | 4.31 | 87.3 |
| 6 | 2.71 | 0.165 | 75 | 3.43 | 89.1 |
| 7 | 8.1 | 0.495 | (²) | 4.83 | 89.3 |

[1] G. polymer obtained/g. TiCl₃·hr.
[2] Negligibly small.

EXAMPLES 8–16

Into a 300 cc. volume stainless steel autoclave were placed 3 sealed glass ampules respectively containing 2.5 mmols of titanium trichloride (obtained by reducing titanium tetrachloride with hydrogen), 5.0 mmols of triethylaluminum and triethyl antimony dichloride in various amounts, and then the autoclave was sealed and replaced with dry nitrogen gas. Thereafter, it was evacuated, and 150 ml. of n-hexane and 0.5 mol of propylene were introduced in vacuo. The autoclave was immersed in a water bath held at 60° C., and when the inner temperature rose to 60° C., the ampules were broken to effect polymerization under shaking. After being shaken for 16 hrs. the polymers were taken out and 500 ml. of methanol were added to each to decompose the catalyst. Then, the polymers were dried. The values of isotacticity, intrinsic viscosity and polymerization rate were measured by the same manner as in Examples 1–7.

The results obtained are shown in Table 5.

TABLE 5

| Exp. No. | $Sb(C_2H_5)_3Cl_2$ (mmol) | $Sb(C_2H_5)_3Cl_2/$ $TiCl_3$ (mol ratio) | Rate (g./g. hr.) | Isotacticity (percent) | $\eta_{sp}/C$ (g./100 cc.)$^{-1}$ |
|---|---|---|---|---|---|
| 8 | 0 | 0 | 17.4 | 68.5 | 2.91 |
| 9 | 0 | 0 | 24.3 | 67.5 | 2.15 |
| 10 | 0.025 | 0.010 | 47.2 | 86.8 | 3.92 |
| 11 | 0.083 | 0.033 | 53.6 | 86.5 | 3.68 |
| 12 | 0.083 | 0.033 | 53.6 | 88.0 | 3.83 |
| 13 | 0.25 | 0.10 | 40.7 | 85.0 | 3.92 |
| 14 | 0.25 | 0.10 | 40.7 | 85.3 | 3.89 |
| 15 | 0.83 | 0.33 | 2.6 | 73.6 | 3.69 |
| 16 | 0.83 | 0.33 | 2.6 | 74.4 | 3.95 |

EXAMPLE 17

150 ml. of n-hexane were placed in an autoclave of stainless steel having a capacity of 300 ml., and 0.57 g. of triethylaluminum, 0.38 g. of titanium trichloride and further 50 mg. of $(C_2H_5)_3SbCl_2$ were added under an oxygen free dry nitrogen atmosphere and the lid of the autoclave was closed. The autoclave was cooled to −80° C. and then 20 grams of pure propylene were condensed therein and the temperature was raised to 70° C., and the contents were shaken to effect polymerization for 2 hours.

The polymerization proceeded rapidly and the polymerization pressure came down completely in about 30 min. The residual catalyst in the polymerization product thus obtained was decomposed with 500 ml. of methanol, and the product was boiled with 30% hydrochloric acid methanol and rinsed with water and dried to obtain 19.5 grams of white powderlike polymer. The insoluble portion of the thus obtained polymer in boiling n-heptane was 88.2%, and the instrinsic viscosity in Tetralin at 135° C. was 3.52.

EXAMPLE 18

70 mg. of $(C_2H_5)_3SbI_2$ dissolved in 100 grams of benzene were placed in an autoclave of 300 ml. capacity which was equipped with a magnetic stirrer, and 1.03 g. of tripropyl aluminum and 0.46 g. of titanium trichloride were added therein and 0.5 mole of propylene was polymerized for about one hour at 60° C. under the same procedure as described in Example 1. The polymerization proceeded quickly and the polymerization pressure came down completely in about one hour to form 19.5 grams of a solid white polymer. Insoluble portion of the thus obtained polymer in boiling n-heptane was 88.9% and the intrinsic viscosity in Tetralin at 135° C. was 3.73.

EXAMPLE 19

250 ml. of n-heptane were placed in an autoclave of stainless steel having a capacity of 500 ml. which was equipped with a magnetic stirrer, and 0.285 g. of triethylaluminum and 0.097 g. of titanium trichloride and then 10 mg. of $(C_2H_5)_3SbCl_2$ were added under an oxygen free dry nitrogen atmosphere and the lid of the autoclave was closed. Pure propylene was charged into the autoclave which was placed in an oil bath at 70° C. under a pressure, so as to maintain the partial pressure at 3.0 kg./cm.$^2$ under stirring with the magnetic stirrer. After continuing the polymerization for 3 hours, the lid was opened. The polymer thus obtained was purified with methanol and rinsed with water and was dried to obtain 44 grams of white powderlike polymer. The rate of polymerization, the insoluble portion of the thus obtained polymer in boiling n-heptane and the intrinsic viscosity in Tetralin at 135° C. were as cited in the above-mentioned table. As clearly seen in the results, the rate of polymerization was very large and the polymer was highly crystalline.

EXAMPLE 20

In the same procedure as in Example 1, 0.5 mole (21 grams) of propylene of 99.8% purity was polymerized by using 0.57 gram of triethyl aluminum, 0.35 gram of titanium trichloride and 20 mg. of $(C_2H_5)_3SbBr_2$. The polymerization was performed at 50° C. for 2 hours. The residual catalyst in the polymer thus obtained was made to resolve, removed and dried in vacuo to obtain 19.5 grams of white powderlike polymer. The insoluble portion of the thus obtained polymer in boiling n-heptane was 91.3%, and the intrinsic viscosity in Tetralin at 135° C. was 4.72.

EXAMPLE 21

0.65 g. of $Al(C_3H_7)_3$, 0.38 g. of titanium trichloride and 20 mg. of $(C_3H_7)_3SbCl_2$ and 150 ml. of n-heptane were placed in a three neck flask of 300 ml. capacity which was equipped with a reflux condenser, a stirrer and a thermometer, and the resulting mixture was allowed to react for 2 hours at 60° C. and subsequently the reaction mixture was transferred to an autoclave of 300 ml. capacity. The autoclave was cooled to $-70°$ C. and then 21 grams of propylene were condensed therein and the temperature raised to 50° C., and the content polymerized. The polymerization pressure amounted to 5.6 kg./cm.$^2$ at the initial stage, but decreased to 0.7 kg./cm.$^2$ after one hour. 19.8 grams of white powderlike polymer were obtained by the same procedure as in Example 1. The insoluble portion of the thus obtained polymer in boiling n-heptane was 90.5%, and the intrinsic viscosity in Tetralin at 135° C. was 4.31.

EXAMPLE 22

In the same procedure as in Example 1, 21 grams of proplyene were polymerized by using 0.24 g. of titanium trichloride [corresponds to $(TiCl_3)_3 \cdot AlCl_3$] which was obtained by reducing titanium tetrachloride with metallic-aluminum and contained $AlCl_3$, 0.36 g. of diethyl aluminum chloride and 80 mg. of $Sb(C_3H_7)_3Cl_2$, at 50° C. After continuing polymerization for 3 hours, the residual catalyst, the polymer thus obtained was decomposed with methanol and the polymer was rinsed with methanol and dried in vacuum to obtain 20.5 grams of white powderlike polymer. The insoluble portion of the obtained polymer in boiling n-heptane was 98.9%, and the intrinsic viscosity in Tetralin at 135° C. was 12.4.

EXAMPLE 23

In the same procedure as in Example 6, 21 grams of propylene were polymerized at 80° C. by using 0.24 g. of titanium trichloride [corresponds to $(TiCl_3)_3 \cdot AlCl_3$], 0.36 g. of diethyl aluminum chloride and 90 mg. of $Sb(i-C_4H_9)_3Cl_2$. After continuing the polymerization for 3 hours, the residual catalyst was decomposed with methanol and the product was washed with methanol to remove the residual catalyst and dried in vacuo to obtain 20 grams of white powderlike polymer. The insoluble portion of the obtained polymer in boiling n-heptane was 95.2%, and the intrinsic viscosity in Tetralin at 135° C. was 11.8.

EXAMPLE 24

By the procedure of Example 1 except that 28 grams of butene-1 of 98.5% purity were employed instead of 20 grams of highly pure propylene, the butene-1 was polymerized for 3 hours. The residual catalyst in the polymer thus obtained was decomposed and removed with 500 ml. of methanol to obtain 24.5 grams of white powderlike polymer.

EXAMPLE 25

By the procedure of Example 1 except that 30 grams of styrene were employed instead of propylene, the styrene was polymerized for 3 hours. The product was precipitated and washed with methanol to obtain 16 grams of white powderlike polymer.

EXAMPLE 26

By the procedure of Example 6 except that 40 grams of 4-methyl-pentene-1 (purity: 98.5%) were employed instead of pure propylene, the 4-methyl-pentene-1 was polymerized for 8 hours. After purifying with methanol, 38 grams of white powderlike polymer were obtained. The insoluble portion of the obtained polymer in boiling n-heptane was more than 85%.

EXAMPLE 27

By the procedure of Example 10, 30 g. of pure 3-methyl-butene-1 were poylmerized for 8 hours. After purifying whit methanol, 27 g. of white powderlike polymer were obtained. The insoluable portion of the obtained polymer in boiling n-heptane was 95%.

EXAMPLE 28

15 liters of n-hexane were placed in a 30 liter reactor made of stainless steel which was equipped with stirrer, and 10 grams of titanium trichloride and 15 grams of triethyl aluminum dissolved in 50 ml. of n-hexane and then 1.0 gram of $(C_2H_5)_3SbCl_2$ were added therein. Then the reactor was kept at 80° C. and the catalyst components were reacted for 30 min. The reactor was cooled to 0° C. and evacuated for a minute to remove the evolved gas. The reactor was heated again at 60° C. Propylene was introduced to a reactor under the pressure of 3.0 kg./cm.$^3$ and was made to polymerize under stirring for 3 hours. At the end of the polymerization, the residual catalyst in the polymer was decomposed by adding methanol and the white powderlike polymer obtained was then washed with methanol, rinsed with water and dried to yield about 5 kg. of white powdered polymer. The rate of polymerization corresponded to 170 grams of polymer per hour per gram of titanium trichloride. The insoluable residue in boiling n-heptane of the polymer was 80%. The polymer thus obtained was subjected to extruding to produce a film with good touch.

REFERENTIAL EXAMPLE 1

In the same procedure as in Example 3, that is the binary catalyst system composed of the same triethyl aluminum and the same titanium trichloride in the same amount as in Example 3 was utilized, and the propylene was polymerized. The results are described in the above table, that is, the rate of polymerization was small, the insoluble portion of the polymer in boiling n-heptane was 76.6% and the intrinsic viscosity in Tetralin at 135° C. was 3.15.

REFERENTIAL EXAMPLE 2

0.24 g. of titanium trichloride corresponds to $$(TiCl_3)_3 \cdot AlCl_3]$$

and 0.36 g. of diethyl aluminum-chloride were sealed into separate glass ampoules. These two glass ampoules and 150 ml. of purified n-heptane were placed in an autoclave of stainless steel having a capacity of 300 ml. which was equipped with a magnetic stirrer. The autoclave was cooled to $-70°$ C. and then 21 grams of pure propylene was condensed therein in vacuo and the temperature was raised to 80° C. The contents were polymerized at 80° C. under stirring. The polymerization pressure decreased to 1.2 kg./cm.$^2$ after 3.0 hours. Subsequently, the autoclave was cooled, the residual catalyst was decomposed with 5 ml. of methanol which was charged under pressure, the lid was opened and the contents treated with 300 ml. of methanol to obtain 19.7 grams of white powderlike polymer. The insoluble portion of the obtained polymer in boiling n-heptane was 91.5%, and the intrinsic viscosity in Tetralin at 135° C. was 8.29.

What is claimed is:
1. A process for manufacturing a crystalline polyolefin enriched in isotactic structure at a rapid polymerization rate which comprises polymerizing an α-olefin or styrene in the presence of a catalyst obtained by the reaction of (A) titanium trichloride in the range of 0.0001 to 0.05 mole per mole of α-olefin to be polymerized, (B) an organo-aluminum compound in the range of 1 to 8 moles per mole of said titanium trichloride and (C) a trialkyl antimony dihalide of the formula $R_3SbX_2$, wherein R is an alkyl group of 2 to 5 carbon atoms and X is a halogen atom, in the range of 0.001 to 0.2 mole per mole of titanium trichloride in a polymerization medium, the presence of the trialkyl antimony dihalide in the above range producing a very rapid polymerization rate.

2. A process according to claim 1 wherein the said organo-aluminum compound is selected from the group consisting of a trialkyl aluminum and a dialkyl aluminum chloride.

3. A process according to claim 1 wherein the said trialkyl antimony dihalide is selected from the group consisting of $(C_2H_5)_3SbCl_2$, $(C_2H_5)_3SbBr_2$, $(C_2H_5)_3SbI_2$, $(C_3H_7)_3SbCl_2$ and $(C_4H_9)_3SbCl_2$.

4. A process according to claim 1 wherein the said titanium trichloride is selected from the group consisting of hydrogen-reduced titanium trichloride and metal-reduced titanium trichloride.

5. A process according to claim 1 wherein the said catalyst is selected from the group consisting of the product obtained by the reaction of aluminum-reduced titanium trichloride, dialkyl aluminum chloride and triethyl antimony dichloride.

6. A process according to claim 1 wherein the said trialkyl antimony dihalide, the said organo-aluminum compound and the said titanium trichloride are made to react in an inert hydrocarbon medium at a temperature of between 20° C. and 80° C.

7. A process according to claim 1 wherein an inert hydrocarbon for the reaction medium selected from the group consisting of n-heptane, n-hexane, isooctane, benzene, toluene, cyclohexane and tetrahydronaphthalane is used.

8. A process according to claim 1 wherein the polymerization is conducted at a temperature between 15° and 120° C.

9. A process according to claim 1 wherein the polymerization is carried out at a pressure between atmospheric pressure and 50 atms.

10. A process according to claim 1 wherein said α-olefin is propylene, butene-1, 3-methyl-butene-1, hexene-1, pentene-1 or 4-methyl-pentene-1.

References Cited

UNITED STATES PATENTS

| | | | |
|---|---|---|---|
| 3,325,462 | 6/1967 | Aishima et al. | 260—93.7 |
| 3,032,510 | 5/1962 | Tornquist et al. | 260—93.7 |

FOREIGN PATENTS

| | | |
|---|---|---|
| 921,954 | 3/1963 | Great Britain. |
| 608,467 | 3/1962 | Belgium. |

JAMES A. SEIDLECK, Primary Examiner

U.S. Cl. X.R.

252—429; 260—93.7, 94.9